United States Patent
Kim et al.

(10) Patent No.: US 10,372,895 B2
(45) Date of Patent: Aug. 6, 2019

(54) APPARATUS AND METHOD FOR PROVIDING A SECURITY ENVIRONMENT

(71) Applicant: Samsung Electronics Co., Ltd., Gyeonggi-do (KR)

(72) Inventors: Yung-Kwan Kim, Seoul (KR); Jong-Seok Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/256,835

(22) Filed: Apr. 18, 2014

(65) Prior Publication Data

US 2014/0380451 A1    Dec. 25, 2014

(30) Foreign Application Priority Data

Jun. 24, 2013  (KR) .................. 10-2013-0072545

(51) Int. Cl.
   *G06F 21/34*     (2013.01)
   *G06F 21/35*     (2013.01)

(52) U.S. Cl.
   CPC .................. *G06F 21/35* (2013.01)

(58) Field of Classification Search
   CPC ........... G06F 21/34; G06F 21/35; G06F 21/74
   See application file for complete search history.

(56) References Cited

U.S. PATENT DOCUMENTS

| | | | |
|---|---|---|---|
| 6,754,825 B1 * | 6/2004 | Lennie et al. | 713/181 |
| 8,036,433 B1 | 10/2011 | Wolff | |
| 2002/0145632 A1 | 10/2002 | Shmueli et al. | |
| 2003/0070074 A1 * | 4/2003 | Geller | G06F 21/31 713/168 |
| 2003/0071850 A1 * | 4/2003 | Geidl | G06F 3/0481 715/781 |
| 2003/0105966 A1 * | 6/2003 | Pu | G06F 21/31 713/186 |
| 2005/0180618 A1 | 8/2005 | Black | |
| 2006/0023922 A1 | 2/2006 | Black | |
| 2009/0019292 A1 | 1/2009 | Fransson et al. | |
| 2010/0251360 A1 | 9/2010 | Sinclair | |
| 2011/0271099 A1 * | 11/2011 | Preiss et al. | H04L 29/06 713/155 |
| 2012/0154413 A1 | 6/2012 | Kim et al. | |

(Continued)

FOREIGN PATENT DOCUMENTS

| | | |
|---|---|---|
| CN | 101026822 A | 8/2007 |
| CN | 101826151 A | 9/2010 |

(Continued)

OTHER PUBLICATIONS

International Search Report dated Oct. 2, 2014 in connection with International Application No. PCT/KR2014/005581; 3 pages.

(Continued)

*Primary Examiner* — Carl G Colin
*Assistant Examiner* — Vance M Little

(57) ABSTRACT

A method for providing a security environment. The method includes detecting user information from an accessory in response to detection of the accessory, performing security authentication with input security information if the user information is detected; and providing the security environment when the security authentication is successful.

10 Claims, 11 Drawing Sheets

(56) References Cited

U.S. PATENT DOCUMENTS

| | | | |
|---|---|---|---|
| 2012/0242603 A1 | 9/2012 | Engelhardt et al. | |
| 2012/0331546 A1 | 12/2012 | Falkenburg et al. | |
| 2013/0106800 A1 | 5/2013 | Yilmaz et al. | |
| 2014/0111453 A1* | 4/2014 | Seo | G06F 3/04883 345/173 |
| 2014/0253467 A1* | 9/2014 | Hicks et al. | 345/173 |
| 2014/0373100 A1* | 12/2014 | Poiesz | G06F 21/30 726/4 |

FOREIGN PATENT DOCUMENTS

| | | |
|---|---|---|
| CN | 102566884 A | 7/2012 |
| CN | 103136479 A | 6/2013 |
| JP | 10-222241 | 8/1998 |
| JP | 2009-211340 | 9/2009 |
| KR | 10-2006-0032258 | 4/2006 |
| KR | 10-2006-0032760 | 4/2006 |
| KR | 10-2007-0085366 | 8/2007 |
| KR | 10-2012-0012870 | 2/2012 |
| KR | 10-2012-0024023 | 3/2012 |

OTHER PUBLICATIONS

Written Opinion of international Searching Authority dated Oct. 2, 2014 in connection with International Appiication No. PCT/KR2014/005561; 6 pages.

Extended European Search Report dated Jan. 31, 2017 in connection with European Application No. 14817297.6, 3 pages.

Office Action dated May 3, 2017 in connection with Chinese Patent Application No. 201480036075.3.

Foreign Communication from Related Counterpart Application; Chinese Patent Application No. 201480036075.3; Second Chinese Office Action dated Jan. 3, 2018; 22 pages.

* cited by examiner

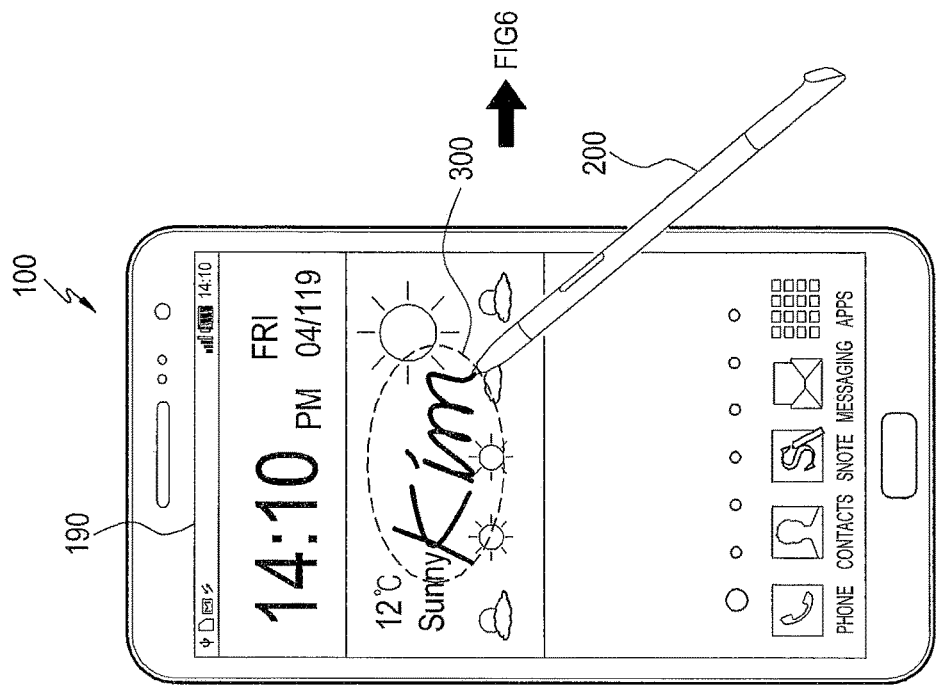
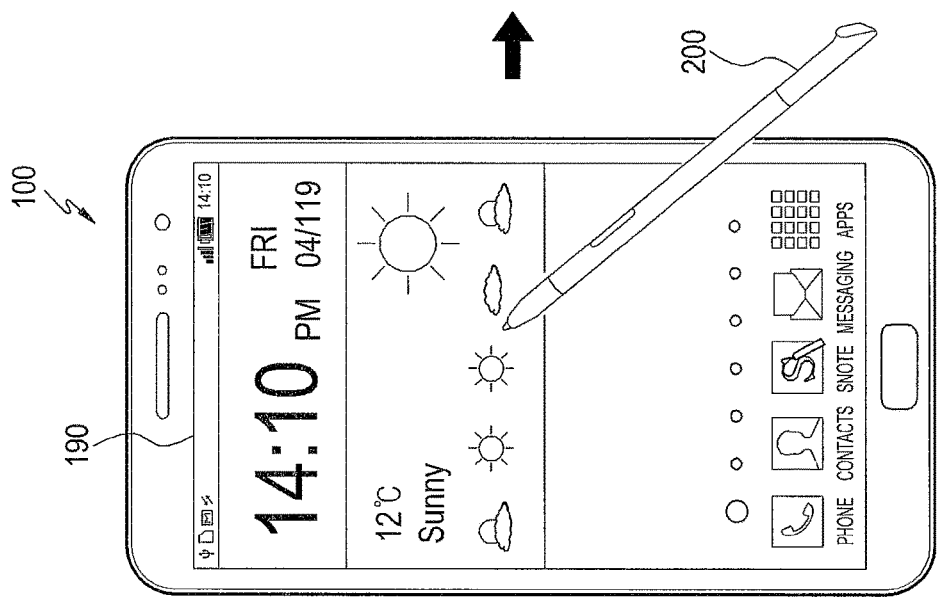
FIG.5B
FIG.5A

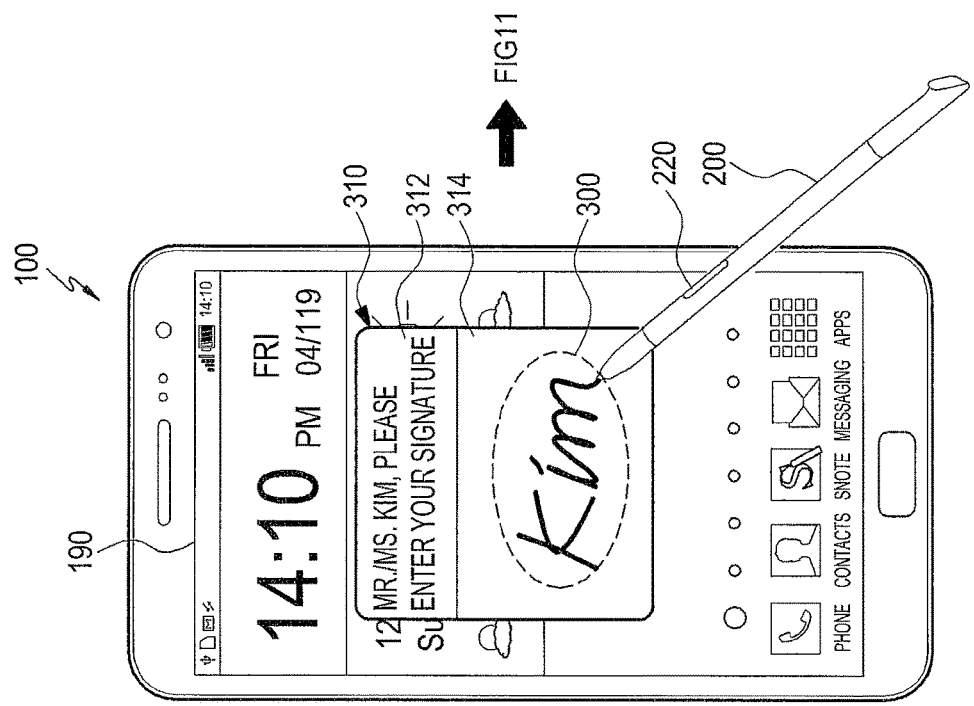
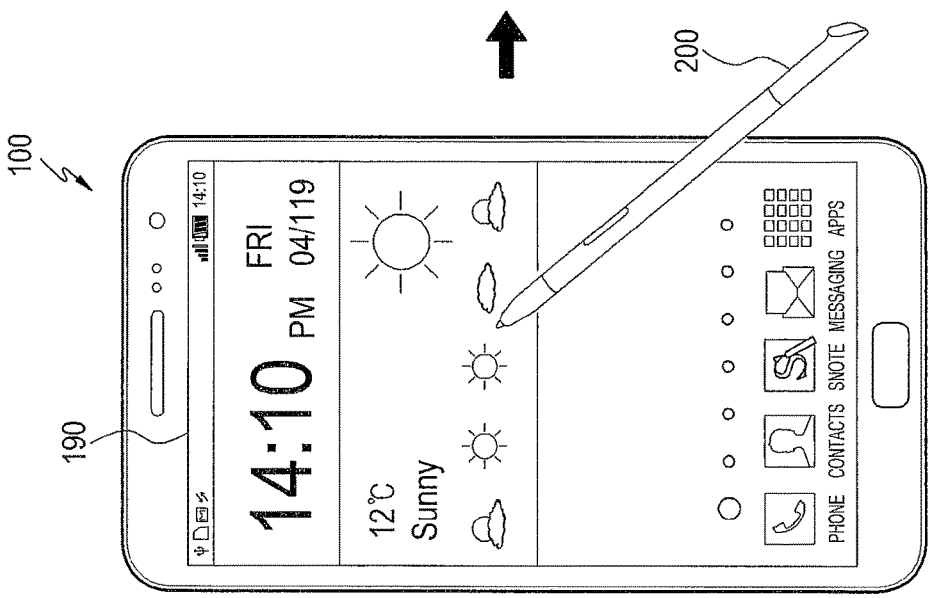
FIG.10B
FIG.10A

APPARATUS AND METHOD FOR PROVIDING A SECURITY ENVIRONMENT

CROSS-REFERENCE TO RELATED APPLICATION(S) AND CLAIM OF PRIORITY

The present application is related to and claims the benefit under 35 U.S.C. § 119(a) of a Korean Patent Application filed in the Korean Intellectual Property Office on Jun. 24, 2013, and assigned Serial No. 10-2013-0072545, the entire disclosure of which is incorporated herein by reference.

TECHNICAL FIELD

The present disclosure relates generally to providing a security environment. More particularly, the present disclosure relates to an apparatus and method for providing a security environment efficiently.

BACKGROUND

With rapid development of modern electronic devices, a variety of services are emerging. In particular, services related to security environments for electronic devices have been provided.

The security environment refers to an environment under which tasks in need of security authentication can be performed. For example, it means an environment provided in performing tasks to deal with confidential data, such as office documents that require security.

In this regard, the electronic device first executes a program that requires security, and proceeds an authentication process in the program with data, e.g., password. The electronic device needs to enter respective data or password for each program in need of security, causing inconvenience to the user.

As a type of the electronic device, mobile devices are widely used for network communication.

The mobile device is easy to carry, but vulnerable to security issues. Furthermore, the mobile device has not yet been given any security environment.

Thus, a need exists for a technology to simply provide immediate security environment for electronic devices and especially for mobile devices.

In addition, a technology to conveniently enter the security environment is more needed.

SUMMARY

To address the above-discussed deficiencies, it is a primary object to provide an apparatus and method for providing a security environment by performing authentication with security information inputted onto a screen, upon detection of connection of an accessory.

In accordance with an aspect of the present disclosure, provided is a method for providing a security environment, the method including: detecting user information from an accessory in response to detection of the accessory; performing security authentication with input security information if the user information is detected; and providing the security environment if the security authentication is successful.

In accordance with another aspect of the present disclosure, provided is a security server including: a controller for performing security authentication by comparing security information received and pre-stored user's security information; and transmitting authentication token information indicating whether the security authentication is successful or failed to at least one electronic device; and a storage for storing the pre-stored user's security information.

In accordance with another aspect of the present disclosure, provided is an apparatus for providing a security environment, the apparatus including: a controller for detecting user information from an accessory in response to detection of the accessory; performing security authentication with input security information if the user information is detected; and providing the security environment if the security authentication is successful; a storage for storing the security information; and a display unit for displaying the security environment.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 5A and 5B illustrate an electronic device performing a method for providing security environment, according to an embodiment of the present disclosure;

FIGS. 10A and 10B illustrates an electronic device performing a security environment providing method, according to an embodiment of the present disclosure.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The disclosure now will be described more fully hereinafter with reference to the accompanying drawings, in which illustrative embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present disclosure. Descriptions shall be understood as to include any and all combinations of one or more of the associated listed items when the items are described by using the conjunctive term "~ and/or ~," or the like.

The terminology used herein is for the purpose of describing particular embodiments only and is not intended to be limiting of the disclosure. It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
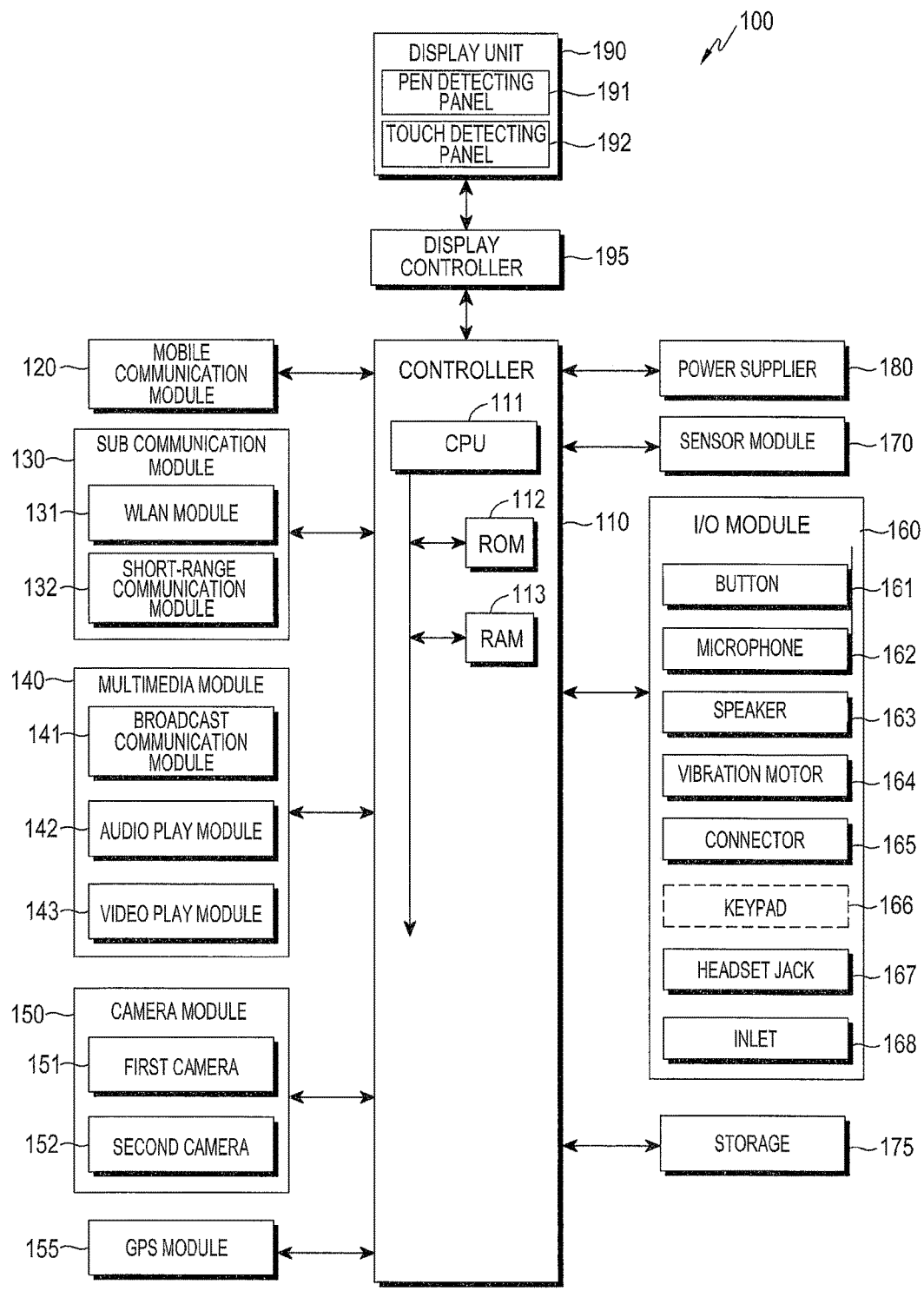
FIG. 1 illustrates a block diagram of an electronic device according to an embodiment of the present disclosure.

FIG. 1 illustrates a block diagram of an electronic device 100 according to an embodiment of the present disclosure.

The electronic device 100 includes, but not limited to, a mobile device, smartphone, tap book, smart tap, smart television (TV), Personal Digital Assistant (PDA), MP3 player, tablet Personal Computer (PC), or desktop PC. The electronic device 100 may include all or some of components as will be described below in connection with FIGS. 1 to 3.

Referring to FIG. 1, the electronic device 100 may be connected to an external device (not shown) by using an external device connection, such as a sub-communication module 130, a connector 165, and an headset jack 167.

The external device may include a variety of devices, such as earphones, external speakers, Universal Serial Bus (USB) memories, chargers, cradles, docking stations, Digital Multimedia Broadcasting (DMB) antennas, payment related devices, health care devices (e.g., blood sugar testers), game consoles, vehicle navigations, or the like, which are removably attached to the electronic device 100 via cable. The external device may also include a short range communication device that may be wirelessly connected to the electronic device 100 via short range communication, such as Bluetooth, Near Field Communication (NFC), etc., and a WiFi Direct communication device, a wireless access point (AP), etc. Furthermore, the external device may include a cell phone, smartphone, tablet PC, desktop PC, and server.

Referring to FIG. 1, the electronic device 100 includes a display unit 190 and a display controller 195. In some embodiments, the electronic device 100 may include more than one display unit 190 and more than one display controller 195. The display unit 190 may have at least one panel depending on input schemes, and the display controller 195 may have a controller for each panel, which detects an input command through the display unit 190 and forwards the input command to a controller of the electronic device 100. The display unit 190 may include a pen detecting panel (also known as a pen recognition panel) 191 for detecting the movement, e.g., touching and/or hovering, of a pen, and a touch detecting panel (also known as a touch recognition panel) 192 for detecting touches of a human finger. The display controller 195 may include a pen detecting controller (not shown) for forwarding the input information detected from the pen detecting panel 191 to the controller 110, and a touch detecting controller (not shown) for forwarding the input information detected from the touch detecting panel 192 to the controller 110. The electronic device 110 also includes a controller 110, the mobile communication module 120, the sub-communication module 130, a multimedia module 140, a camera module 150, a Global Positioning System (GPS) module 155, an input/output module 160, a sensor module 170, a storage 175, and a power supply 180. The sub-communication module 130 includes at least one of Wireless Local Area Network (WLAN) 131 and a short-range communication module 132, and the multimedia module 140 includes at least one of a broadcast communication module 141, an audio play module 142, and video play module 143. The camera module 150 includes at least one of a first camera 151 and a second camera 152; and the input/output module 160 includes at least one of buttons 161, a microphone 162, a speaker 163, a vibration motor 164, a connector 165, a keypad 166, and a headset jack 167.

The controller 110 may include a Central Processing Unit (CPU) 111, a Read Only Memory (ROM) 112 for storing a control program to control the electronic device 100, and a Random Access Memory (RAM) 113 for storing signals or data input from an outside or for being used as a memory space for working results in the electronic device 100. The CPU 111 may include a single core as well as multiple cores, such as dual cores, triple cores, or quad cores. The CPU 111, ROM 112, and RAM 113 may be connected to each other via an internal bus.

The controller 110 may control the mobile communication module 120, the sub-communication module 130, the multimedia module 140, the camera module 150, the GPS module 155, the input/output module 160, the sensor module 170, the storage 175, the power supply 180, the display unit 190, and the display controller 195.

In various embodiments of the present disclosure, the controller 110 determines if user information has been received from an accessory in response to detection of the accessory, performs security authentication with input security information if it is determined that the user information has been received, and switches the electronic device 100 into the security environment after successful security authentication. The accessory includes various means which are capable of providing a command or input to the electronic device by means of contact with or hovering over the display unit 190. For example, the accessory may include a Resistor-Capacitor (RC) circuit for performing communication with the electronic device 100, and in particular, the RC circuit may be included and activated in the accessory or in a controller of the accessory that controls overall operation of the accessory. The accessory may store user information authenticated by the user who actually owns or uses the accessory. The controller 110 may detect the accessory in wireless communication with the accessory. The security information is input onto a currently running screen. The controller 110 compares the input security information with user's security information stored in the storage 175, and performs the security authentication based on the comparison. The security authentication is performed by comparing the input security information with pre-stored user's security information that corresponds to an identification of the accessory, i.e., an accessory ID. In other embodiments, the controller 110 may encrypt the input security information and send the encrypted security information to a security server. Upon reception of authentication token information in return for the security information sent, the controller 110 determines from the authentication token information whether the security authentication has been successful. The authentication token information is created by the security server comparing the encrypted security information with the pre-stored user's security information.

The controller 110 displays a security authentication screen on the display unit 190 upon detection of the accessory or upon detection of connection of the accessory. The accessory may include an electronic pen equipped with at least one button. The controller 110 may display the security authentication screen upon detection of the press or input of the button of the electronic pen.

The mobile communication module 120 connects the electronic device 100 to an external device through mobile communication using at least one—one or more—antennas (not shown) under control of the controller 110. The mobile communication module 120 transmits/receives wireless signals for voice calls, video conference calls, Short Message Service (SMS) messages, or Multimedia Message Service (MMS) messages to/from a cell phone (not shown), a smart phone (not shown), a tablet PC (not shown), or another device, the phones having phone numbers to be entered into the electronic device 100.

The sub-communication module 130 may include at least one of the WLAN module 131 and the short-range communication module 132. For example, the sub-communication module 130 may include either the WLAN module 131 or the-short range communication module 132, or both.

The WLAN module 131 may be connected to the Internet in a place where there is a wireless AP (not shown), under control of the controller 110. The WLAN module 131 supports Institute of Electrical and Electronic Engineers' (IEEE's) WLAN standard IEEE802.11x.

The short-range communication module 132 may perform short-range communication between the electronic device 100 and an external device (not shown) under control of the controller 110. The short-range communication may include Bluetooth, Infrared Data Association (IrDA), NFC, etc.

The electronic device 100 may include at least one of the mobile communication module 120, the WLAN module 131 and the short-range communication module 132 depending on the performance. For example, the electronic device 100 may include a combination of the mobile communication module 120, the WLAN module 131 and the short-range communication module 132 depending on the performance.

The multimedia module 140 may include the broadcast communication module 141, the audio play module 142, or the video play module 143. The broadcast communication module 141 may receive broadcast signals (e.g., television broadcast signals, radio broadcast signals, or data broadcast signals) and additional broadcast information (e.g., Electric Program Guide (EPG) or Electric Service Guide (ESG)) transmitted from a broadcasting station through a broadcast communication antenna (not shown), under control of the controller 110. The audio play module 142 may play digital audio files (e.g., files having extensions, such as mp3, wma, ogg, or way) stored or received under control of the controller 110. The video play module 143 may play digital video files (e.g., files having extensions, such as mpeg, mpg, mp4, avi, move, or mkv) stored beforehand or received from outside, under control of the controller 110. The video play module 143 may also play digital audio files.

The multimedia module 140 may include the audio play module 142 and the video play module 143 except for the broadcast communication module 141.

The audio play module 142 or video play module 143 of the multimedia module 140 may be included in the controller 110.

The camera module 150 may include at least one of the first and second cameras 151 and 152 for capturing still images or video images under control of the controller 110. Furthermore, the first or second camera 151 or 152 may include an auxiliary light source (e.g., flash 153, FIG. 3) for providing as much an amount of light as required for capturing. The first camera 151 may be placed on the front of the electronic device 100 and the second camera 152 may be placed on the back of the electronic device 100. Alternatively, the first camera 151 and the second camera 152 may be closely arranged to capture three dimensional (3D) still images or 3D video footage.

The GPS module 155 receives radio signals from a plurality of GPS satellites (not shown) in Earth's orbit, and may calculate the position of the electronic device 100 by using time of arrival from the GPS satellites to the electronic device 100.

The input/output module 160 may include at least one of a plurality of buttons 161, the microphone 162, the speaker 163, the vibration motor 164, the connector 165, and the keypad 166.

The at least one of buttons 161 may be arranged on the front, side, or back of the housing of the electronic device 100, and may include at least one of power/lock button, volume button, menu button, home button, back button, and search button.

The microphone 162 generates electric signals from received voice or sound under control of the controller 110.

The speaker 163 may output sounds corresponding to various signals (e.g., radio signals, broadcast signals, digital audio files, digital video files or photography signals) from the mobile communication module 120, sub-communication module 130, multimedia module 140, or camera module 150 to the outside under control of the controller 110. The speaker 163 may output sounds (e.g., button-press sounds or ringback tones) that correspond to functions performed by the electronic device 100. There may be one or multiple speakers 163 arranged in a proper position or proper positions of the housing of the electronic device 100.

The vibration motor 164 may convert an electric signal to a mechanical vibration under control of the controller 110. For example, the electronic device 100 in a vibrating mode drives the vibration motor 164 when receiving a voice call from another device (not shown). There may be one or more vibration motors 164 inside the housing of the electronic device 100. The vibration motor 164 may be driven in response to a touch activity or continuous touches of a user over the display unit 190.

The connector 165 may be used as an interface for connecting the electronic device 100 to an external device (not shown) or a power source (not shown). Under control of the controller 110, the electronic device 100 may transmit data stored in the storage 175 of the electronic device 100 to the external device via a cable connected to the connector 165, or receive data from the external device. The external device may be a docking station and the data may be an input signal received from the external device, e.g., a mouse, a keyboard, or the like. Furthermore, the electronic device 100 may be powered by the power source via a cable connected to the connector 165 or may charge the battery (not shown) with the power source.

The keypad 166 may receive key inputs from the user to control the electronic device 100. The keypad 166 includes a physical keypad (not shown) formed in the electronic device 100, or a virtual keypad (not shown) displayed on the display unit 190. The mechanical keypad formed in the electronic device 100 may be omitted depending on the performance or structure of the electronic device 100.

A headset (not shown) may be inserted into the headset jack 167 and thus connected to the electronic device 100.

The sensor module 170 includes at least one sensor for detecting a status of the electronic device 100 or external conditions. For example, the sensor module 170 may include a proximity sensor to detect the proximity of the user to the electronic device 100 and a light sensor to detect brightness of ambient light of the electronic device 100. The sensor module 170 may also include a gyro sensor. The gyro sensor may detect operations of the electronic device 100 (e.g., rotation, acceleration, or vibration of the electronic device 100), detect points of the compass using the Earth's magnetic field, and detect the direction of gravity. The sensor module 170 may also include a barometer to measure atmospheric pressure. At least one sensor may detect corresponding status, and generate and send a corresponding signal to the controller 110. The sensor of the sensor module 170 may be added or removed depending on the performance of the electronic device 100.

The storage 175 may store signals or data input/output according to operations of the mobile communication module 120, the sub-communication module 130, the multimedia module 140, the camera module 150, the GPS module, the input/output module 160, the sensor module 170, the display unit 190 under control of the controller 110. The storage 175 may store the control programs and applications for controlling the electronic device 100 or the controller 110.

The term "storage" implies not only the storage 175, but also the ROM 112, RAM 113 in the controller 110, or a memory card (not shown) (e.g., an Secure Digital (SD) card, a memory stick) installed in the electronic device 100.

The storage may also include a non-volatile memory, volatile memory, Hard Disc Drive (HDD), or Solid State Drive (SSD). The storage 175 stores at least one piece of security information input onto the display unit 190 and the authentication token information received from the security server. The storage 175 also stores at least one piece of user's security information to be compared with the security information input through the display unit 190. The user's security information may vary depending on users.

The power supply 180 may supply power to one or more batteries (not shown) placed inside the housing of the electronic device 100 under control of the controller 110. The one or more batteries power the electronic device 100.

The power supply 180 may supply the electronic device 100 with the power input from the external power source (not shown) via a cable connected to the connector 165. The power supply 180 may also supply the electronic device 100 with wireless power from an external power source using a wireless charging technology.

The display unit 190 may include a touchscreen. The touch screen may provide the user with user interfaces for various services (e.g., call, data transmission, broadcasting, photography services). The display unit 190 may send an analog signal corresponding to at least one touch input to the user interface to the display controller 195. The display unit 190 may detect the at least one touch made by user's physical contact (e.g., by fingers including thumb) or by a touchable input device (e.g., an electronic pen or a stylus pen). The display unit 190 may also receive consecutive moves of a touch e.g., touch and drag. The display unit 190 may send an analog signal corresponding to the consecutive moves to the display controller 195.

Upon reception of a command by the user's touch, the touch detecting panel 192 of the display unit 190 may recognize the command, and upon reception of a command by the stylus pen or electronic pen, the pen detecting panel 191 of the display unit 190 may recognize the command. The pen detecting panel 191 may detect a distance between the pen and the screen of the display unit 190 by means of a magnetic field, and may send a signal that corresponds to an input command to the pen detecting controller included in the display controller 195. The touch detecting panel 192 may also receive consecutive moves of a touch, e.g., touch and drag. The touch detecting panel 192 may send an analog signal corresponding to the touch and drag to the touch detecting controller included in the display controller 195. The touch detecting panel 192 may detect touched point by means of electric charges changed by the touch. The display controller 195 may include different controllers for input commands, and may further include a controller for an input of biological information, e.g., the user's iris.

The display unit 190 may display a security authentication screen in response to detection of the accessory, and receive the security information through the security authentication screen by means of touching or hovering. Specifically, under detection of an input of the button equipped on the accessory, under control of the controller 110, the display unit 190 displays the security authentication screen and receives the security information through the security authentication screen. The security information may be set up or changed by the user.

The touch as used herein is not limited to the user's physical contact or touchable input device's contact but may include contactless touches. The detectable distance from the display unit 190 may vary depending on the performance or structure of the electronic device 100.

The display device 190 may be implemented in various ways, such as in a resistive, capacitive, Electronic Magnetic Resonance (EMR), infrared, or acoustic wave scheme, or a combination thereof.

The display controller 195 converts the analog signal received from the display unit 190 to a digital signal (e.g., XY coordinates) and transmits the digital signal to the controller 110. The controller 110 may control the display unit 190 with the digital signal received from the display controller 195. For example, in response to the touch, the controller 110 may enable a shortcut icon (not shown) displayed on the display unit 190 to be selected or to be executed. The display controller 195 may also be incorporated in the controller 110.

Figure 2:
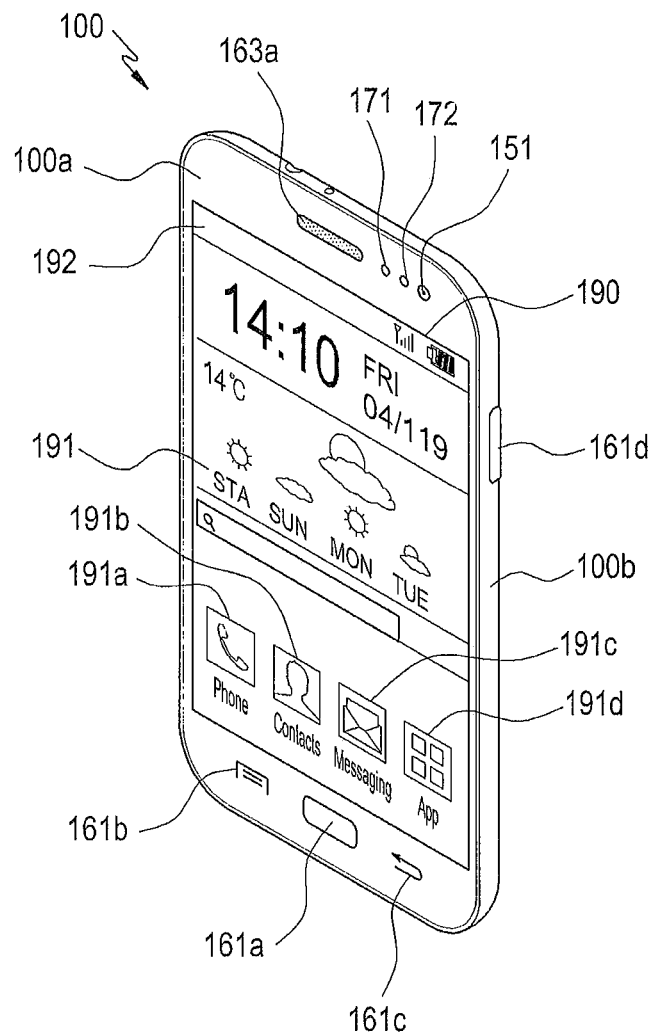
FIG. 2 illustrates a perspective view of the front face of an electronic device, according to an embodiment of the present disclosure.
Figure 3:
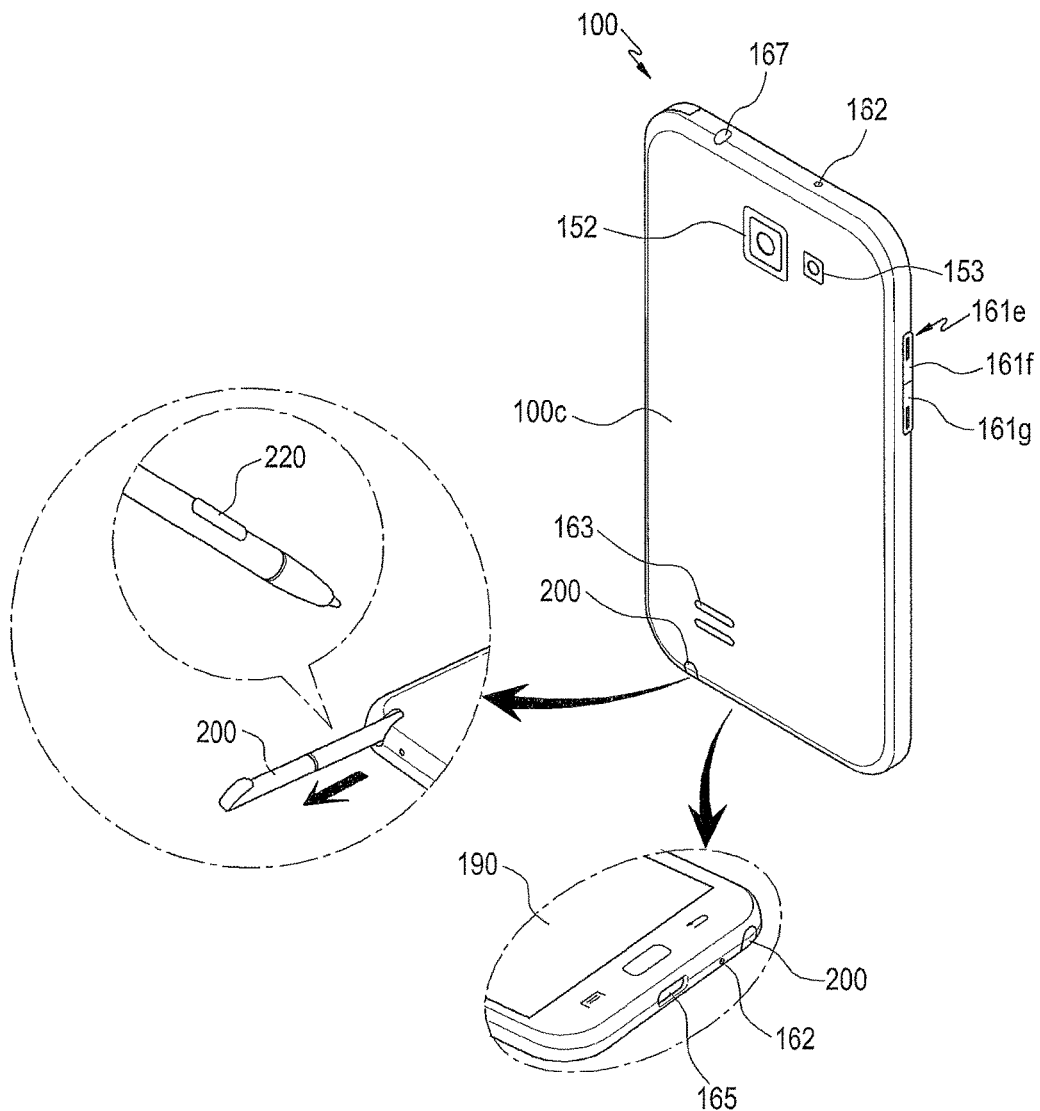
FIG. 3 illustrates a perspective view of the rear face of an electronic device, according to an embodiment of the present disclosure.

FIG. 2 illustrates a perspective view of the front face of an electronic device, according to an embodiment of the present disclosure, and FIG. 3 illustrates a perspective view of the rear face of an electronic device, according to an embodiment of the present disclosure.

Referring to FIG. 2, the front face 100a of the electronic device 100 has the display unit 190 arranged in the center. The display unit 190 may be formed to take up almost all the front face 100a of the electronic device 100. In FIG. 2, the display unit 190 shows an example of displaying a main home screen. The main home screen is supposed to be displayed first on the display unit 190 when the electronic device 100 is powered on. In a case the electronic device 100 has several pages of different home screens, the main home screen may be the first of the several pages of home screens. In the main home screen, shortcut icons 191-1, 191-2, 191-3 for running frequently-used applications, an application key 191-4, time, weather, etc. may be displayed. If selected, the application key 191-4 displays application icons representative of respective applications on the display unit 190. In an upper part of the display unit 190, there may be a status bar 192 for displaying statuses of the electronic device 100, such as a battery charging state, intensity of received signals, current time, etc.

In a lower part of the display unit 190, there may be a home button 161a, a menu button 161b, and a back button 161c arranged.

The home button 161a is to display the main home screen on the display unit 190. For example, if the home button 161a is pressed (or touched) while any home screen other than the main home screen or a menu screen is displayed in the display unit 190, the main home screen may be displayed on the display unit 190. Furthermore, while applications are running on the display unit 190, if the home button 161a is pressed (or touched), the main home screen, as shown in FIG. 2, may be displayed on the display unit 190. The home button 161a may also be used to display recently used applications or a task manager on the display unit 190.

The menu button 161b provides a link menu that may be used on the display unit 190. The link menu may include a widget addition menu, background change menu, search menu, edit menu, environment setting menu, etc. While an application is running, a menu related to the application may be provided.

The back button 161c, when touched, may display a screen that was displayed right before the current screen or stop a most recently used application.

On the edge of the front face 100a of the electronic device 100, the first camera 151, the illumination sensor 171, and the proximity sensor 172 may be placed. On the back of the electronic device 100, the second camera 152, the flash 153, and the speaker 163 may be placed.

On the side 100b of the electronic device 100, e.g., a power/reset button 161d, a volume button 161e, a terrestrial DMB antenna 141a for broadcast reception, one or more microphones 162, etc. may be placed. The DMB antenna 141a may be fixed to the electronic device 100, or be removably arranged.

On the lower side of the electronic device 100, the connector 165 is formed. The connector 165 has a number of electrodes and may be connected to an external device via a cable. On the upper side of the electronic device 100, the headset jack 167 may be formed. The headset jack 167 may receive a headset.

Referring to FIG. 3, on the back of the electronic device 100, the second camera 152, the flash 153, and the speaker 163 may be placed on the upper part of the electronic device 100.

On the lower side of the electronic device 100, there may be an inlet 168 for a separate electronic pen 200.

The electronic device 100 may include a first touch panel for detecting touching of the user's finger and a second touch panel for detecting touching or hovering of the electronic pen 200. The controller 110 of the electronic device 100 may thus discriminatingly detect hovering or touching by the user's finger from hovering or touching by the electronic pen 200.

The electronic pen 200 may include a button 220. When the button 220 is pressed, the controller 110 may detect the pressure of the button 220 from a change of electromagnetic signals exchanged between the electronic pen 200 and the electronic device 100.

Figure 4:
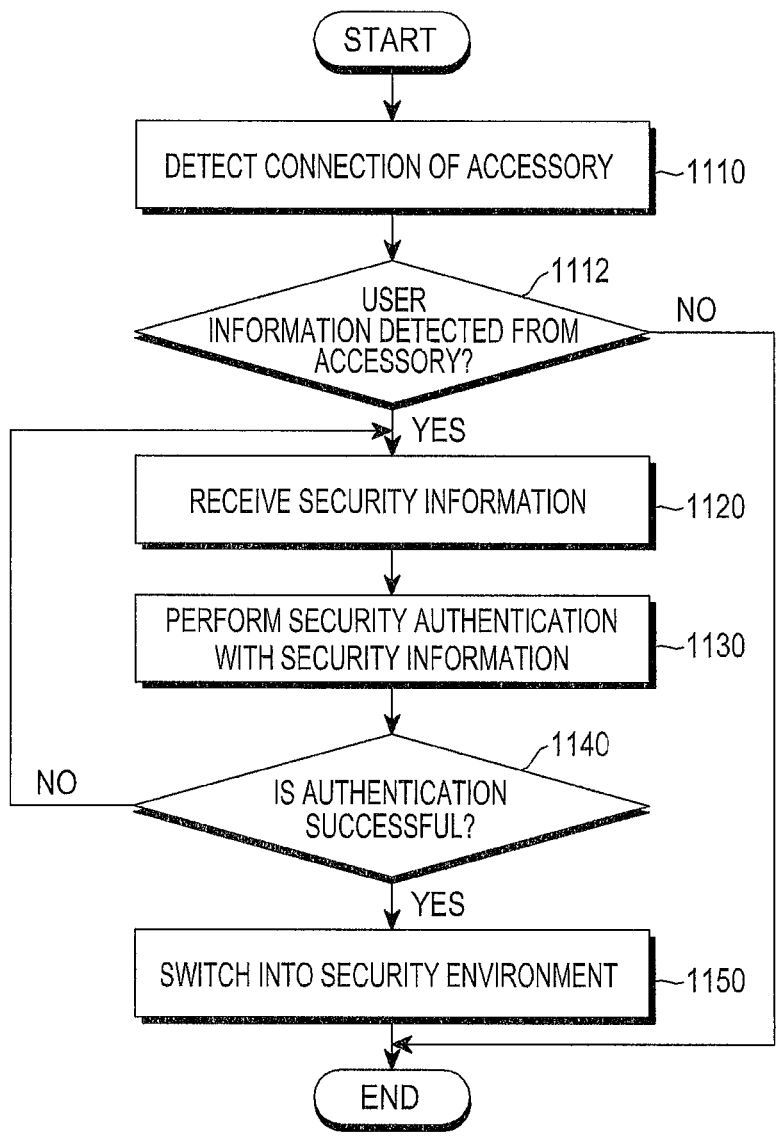
FIG. 4 is flowchart illustrating operations of a method, according to an embodiment of the present disclosure.
Figure 6:
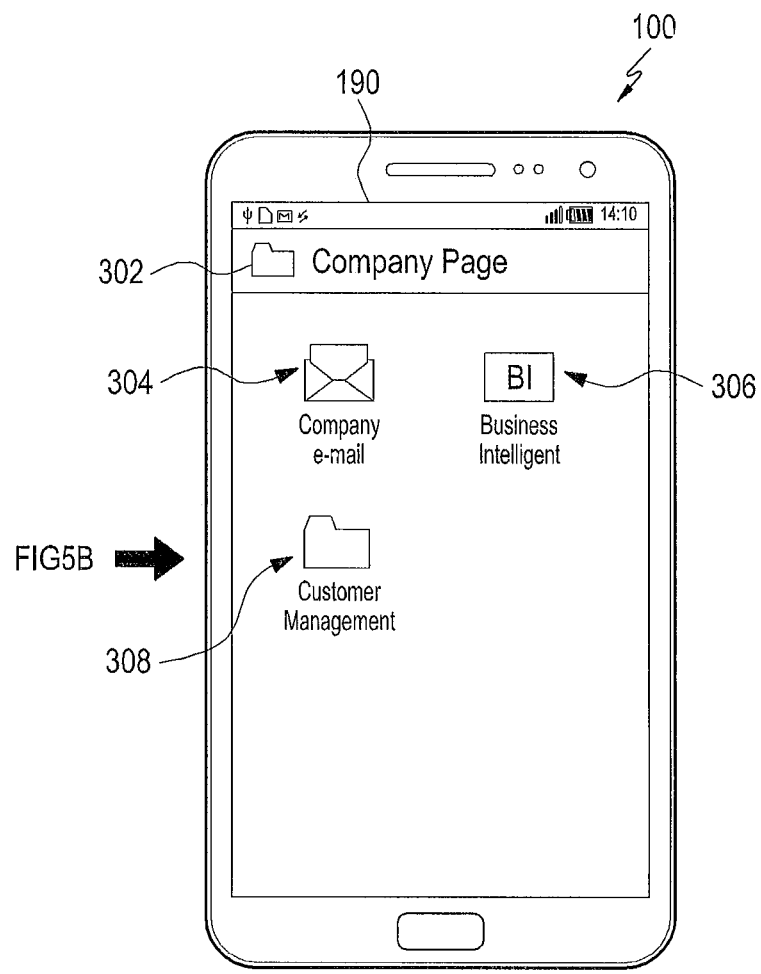
FIG. 6 illustrates an electronic device performing a method for providing security environment, according to an embodiment of the present disclosure.

FIG. 4 is flowchart illustrating operations of a method for providing security environment, according to an embodiment of the present disclosure, and FIGS. 5 and 6 each illustrate an electronic device performing a method for providing security environment, according to an embodiment of the present disclosure.

Referring to FIG. 4, in the embodiment of the method for providing security environment, in step 1110, an accessory is detected. The controller 110 of the electronic device 100 may detect the accessory. The controller 110 detects connection of the accessory in response to communication between the accessory and the electronic device 100 or in response to an input of a button equipped in the accessory. The accessory includes at least one of an electronic pen and an ID card. The controller 110 may detect connection of the accessory, such as the electronic pen or the ID card.

The detection of connection of the accessory may be made through wireless communication. Specifically, the controller 110 may control the short-range communication module 132 to perform wireless communication with the accessory. For example, the controller 110 may detect the connection of the accessory through wireless communication, such as Bluetooth, Infrared, WLAN, or NFC communication. The accessory may also include a short-range communication module for wireless communication. For example, upon reception of a proximity signal from the accessory through the wireless communication, the controller 110 may detect the connection of the accessory.

The controller 110 may display an ordinary screen to be under an ordinary environment rather than the security environment. The ordinary screen may refer to a screen that does not require security, such as home screen.

Referring to FIG. 5A, the controller 110 may detect connection of an accessory, such as the electronic pen 200. The controller 110 may control the short-range communication module 132 to perform short-range communication, such as Bluetooth, Infrared, NFC communication, etc., or to perform WLAN communication, such as WiFi, with the accessory. The controller 110 may then detect connection of the accessory, e.g., electronic pen 200. The electronic pen 200 may also include a short-range communication module for wireless communication. As shown in FIG. 5A, the controller 110 may display an ordinary screen, such as the home screen on the display unit 190. The controller 110 may detect reception of a signal from the accessory through at least one communication, the signal including user information. The user information includes information regarding the user who actually owns or uses the accessory.

Subsequently, in step 1112, the controller 110 detects the user information from the signal received from the accessory. The controller 110 may detect the user information by analyzing the signal received from the accessory, or directly receive the user information from the accessory. In the latter case, the accessory may transmit the signal that includes the user information to the electronic device 100. The user information may indicate that the accessory may be used in the security environment. Thus, if the accessory's user information has been detected, the electronic device 100 is allowed to receive security information, as will be described later. Otherwise, if the user information of the accessory has not been detected, the controller 110 ends the process.

In step 1120, after detection of the accessory's user information, the controller 110 receives the security information. The security information may correspond to a password required for security authentication. For example, the security information may be signature information, number information, or gesture pattern information. The display unit 190 of the electronic device 100 may be a touch screen. For example, the controller 110 may receive the security information, such as the signature information, number information, or gesture pattern information through the display unit 110. In other words, the controller 110 may receive the security information by detecting a signature, number or gesture pattern input onto the display unit 190.

Referring to FIG. 5B, the controller 110 may receive the security information, e.g., signature information 300. For example, the controller 110 may detect touching or hovering of the electronic pen 200, which corresponds to the signature information 300. In other words, the controller 110 may receive the security information, such as the signature information 300 by means of touching or hovering of the electronic pen 200.

The controller 110 may receive the security information on a currently running screen. Referring to FIG. 5B, for example, the controller 110 may display a home screen on the display unit 190, and receive the security information, such as the signature information 300 directly on the currently running home screen. In an embodiment of the present disclosure, upon detection of connection of an accessory, the security information may be received on the currently running screen immediately or in a predetermined period of time. The present disclosure is not limited to receiving the security information immediately or in a predetermined time. For example, in other embodiments, the security information may be received in response to connection of the accessory.

In step 1130, security authentication is performed with the security information received. That is, the controller 110 may perform the security authentication with the security information. The security authentication may refer to determining whether the authentication is successful by comparing the security information received with pre-stored user's security information. The pre-stored user's security information may be security information of the user, which was registered and authenticated beforehand. The user's security information may be stored in the storage 175 beforehand. The controller 110 may authenticate the security information received, if the security information received matches the pre-stored user's security information. For example, the pre-stored user's security information may be the user's signature information, number information or gesture pattern information, which was authenticated beforehand. The controller 110 may perform the authentication by comparing the security information received with the pre-stored user's security information. For example, as shown in FIG. 5B, the controller 110 may perform the authentication by comparing the signature information 300 with pre-stored user's security information. Specifically, the controller 110 may perform the authentication by comparing the signature information 300 included in the security information with signature information included in the pre-stored user's security information. The controller 110 may authenticate the security information received, if the security information received matches the pre-stored user's security information. On the contrary, the controller 110 may not authenticate the security information received, if the signature information 300 included in the security information received does not match or correspond to signature information included in the pre-stored user's security information.

In step 1140, whether the authentication was successful or failed may be determined. That is, the controller 110 may determine whether the authentication was successful or failed. The controller 110 switches the electronic device 100 into the security environment if the authentication was successful. Otherwise, if the authentication was failed, the controller 110 goes back to step 1120 to receive security information again.

If it is determined that the authentication was successful, in step 1150, the electronic device 110 enters the security environment. The controller 110 switches the electronic device 100 into the security environment if the authentication was successful. The security environment refers to an environment entered only if the security authentication is successful. For example, the security environment may be a company environment, individual private environment, or public agency environment that requires the security authentication. In the security environment, tasks in need of security may be performed. For example, applications in need of security may be executed in the security environment. In addition, in the security environment, tasks to deal with confidential data may be performed.

As shown in FIG. 5B, when the security information received is authenticated since the security information, such as the signature information 300 matches signature information included in the pre-stored user's security information, the controller 110 may switch the electronic device 100 into the security environment. FIG. 6 illustrates the electronic device under a company environment as a security environment. Referring to FIG. 6, in the company environment, a company page 302 including secure company information may be displayed on the electronic device 100 when the security environment has been provided.

In the company environment, the electronic device 100 runs applications in need of security, such as a company e-mail application, a business intelligent application, etc. In addition, in the company environment, tasks to deal with confidential data e.g., related to customer management may be performed. The controller 110 may display a shortcut icon 304 for running the company e-mail application, a shortcut icon 306 for running the business intelligent application, or a shortcut icon 308 for opening a customer management folder on the display unit 190.

According to various embodiments of the present disclosure, a running screen may receive security information as soon as the connection of an accessory is detected. That is, without undergoing a separate step, the electronic device 100 may detect the connection of the accessory and receive the security information. In addition, once the authentication was successful with the security information, the electronic device may be switched into the security environment and the user of the electronic device 100 can access secure information, such as the company page 302.

Figure 7:
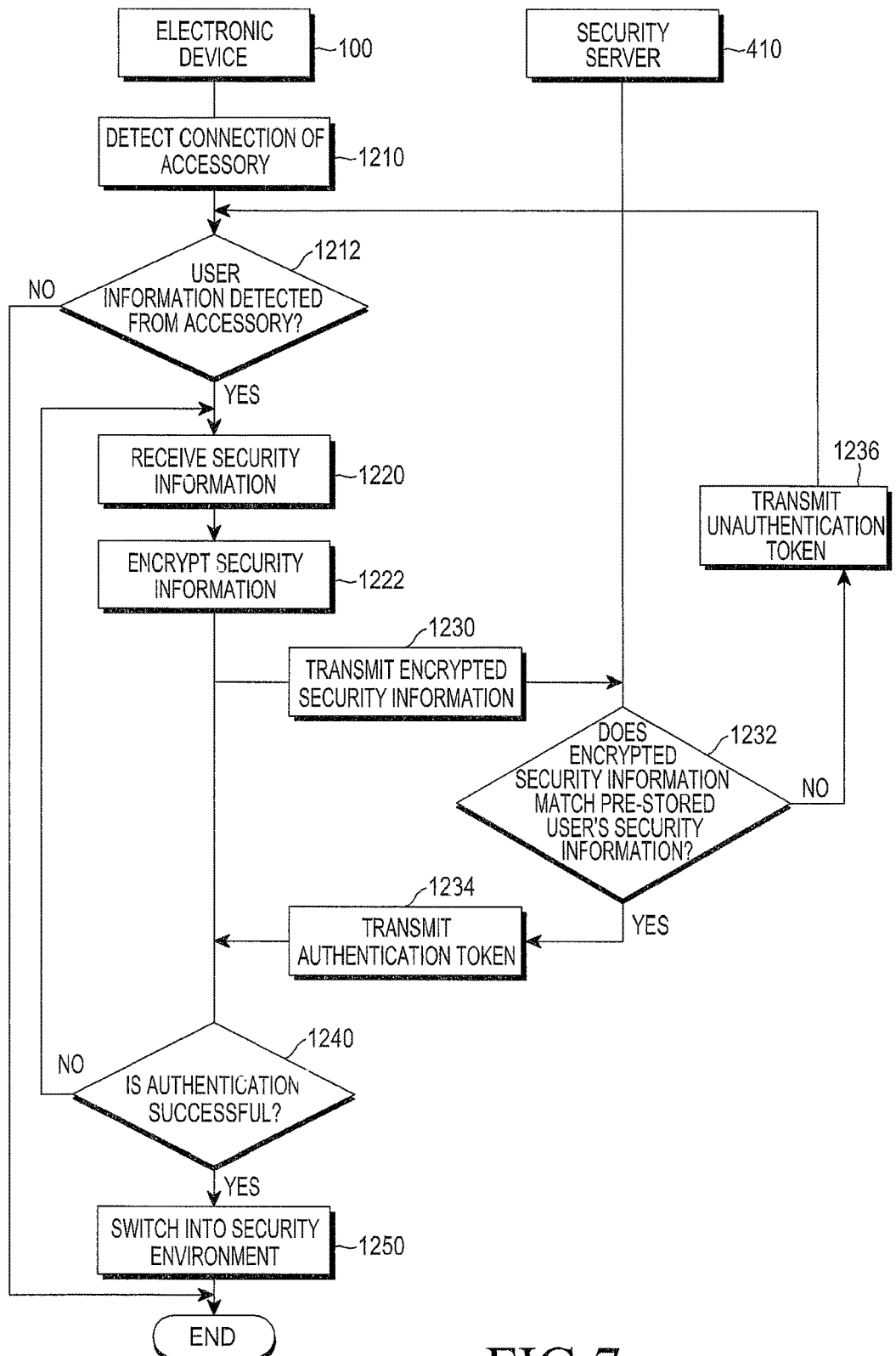
FIG. 7 is flowchart illustrating operations of a method for providing security environment, according to an embodiment of the present disclosure.
Figure 8:
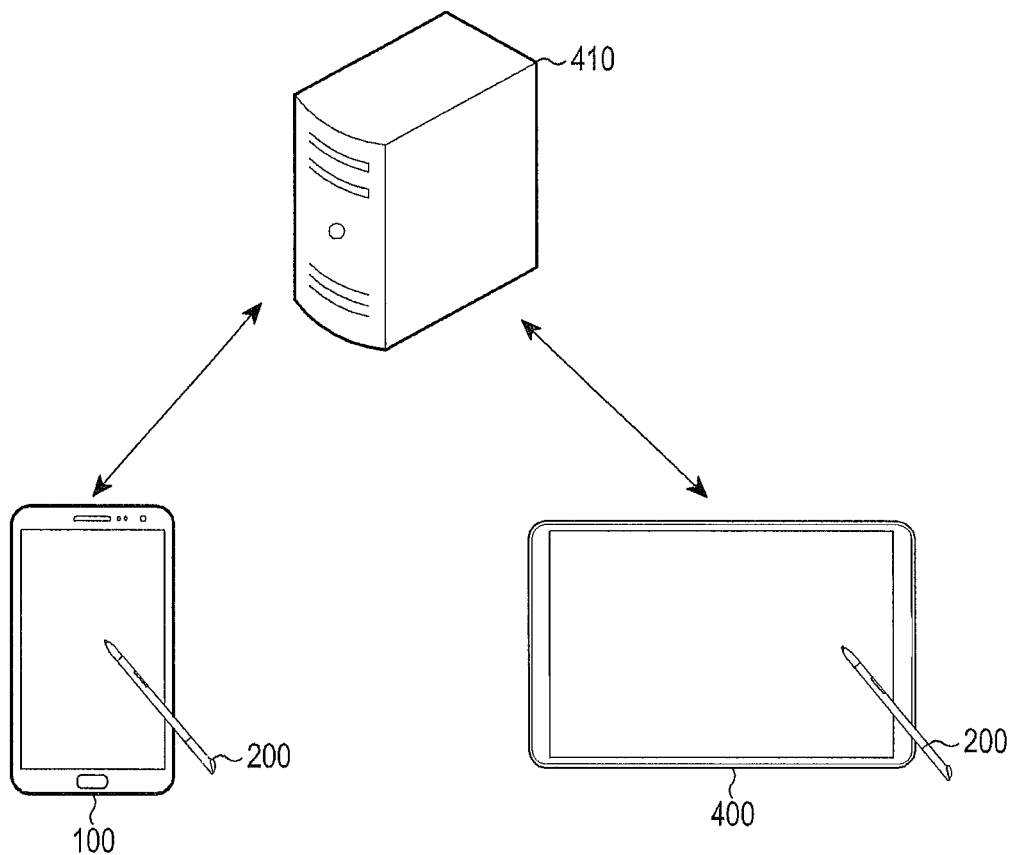
FIG. 8 illustrates multiple electronic devices and a security server in connection with a method for providing security environment, according to an embodiment of the present disclosure.

FIG. 7 is flowchart illustrating operations of a method for providing security environment, according to an embodiment of the present disclosure, and FIG. 8 illustrates multiple electronic devices and a security server in connection with a method for providing security environment, according to an embodiment of the present disclosure.

Referring to FIG. 7, in the embodiment of the method for providing security environment, in step 1210, connection of an accessory is detected.

That is, the controller 110 of the electronic device 100 may detect the connection of the accessory. The accessory includes at least one of an electronic pen and an ID card. The controller 110 may detect connection of the at least one of the electronic pen or the ID card.

The detection of connection of the accessory may be made through wireless communication. Specifically, the controller 110 may control the short-range communication module 132 to perform wireless communication with the accessory. For example, the controller 110 may control the short-range communication module 132 to perform short-range communication, such as Bluetooth, Infrared, NFC communication, etc., or to perform WLAN communication, such as WiFi communication. The controller 110 may detect connection of the accessory. The accessory may also include a short-range communication module for wireless communication. For example, upon reception of a proximity signal from the accessory in the wireless communication, the controller 110 may detect the connection of the accessory.

While doing this, the controller 110 may display an ordinary screen under an ordinary environment rather than the security environment. The ordinary screen may not require security, such as home screen.

The controller 110 may detect connection of an accessory, such as the electronic pen 200. The controller 110 may control the short-range communication module 132 to perform short-range communication, such as Bluetooth, Infrared, NFC communication, etc., or to perform WLAN communication, such as WiFi communication. With the communication, the controller 110 may then detect connection of the accessory, e.g., electronic pen 200. The electronic pen 200 may also include a short-range communication module for wireless communication. While doing this, the controller 110 may display the ordinary screen, such as the home screen on the display unit 190.

Subsequently, in step 1212, the controller 110 detects the user information from the signal received from the accessory. The controller 110 may detect the user information by analyzing the signal received from the accessory, or directly receive the user information from the accessory. The user information may indicate that the accessory may be used in the security environment. If the accessory's user information is detected, the controller 110 is allowed to receive security information. If the accessory's user information is not detected, the controller 110 ends the process. After detection of the accessory's user information, in step 1220, the controller 110 may receive security information. The security information may correspond to a password required for security authentication. In other words, the controller 110 may receive the security information by detecting a signature, number or gesture pattern input onto the display unit 190. For example, the controller 110 may receive the signature information 300 as the security information. The controller 110 may detect touching or hovering of the electronic pen 200, which corresponds to the signature information 300. In other words, the controller 110 may receive the security information, such as the signature information 300 by means of touching or hovering of the electronic pen 200. The controller 110 may also receive the security information on a currently running screen.

Subsequently, in step 1222, the controller 110 encrypts the security information. The controller 110 may encrypts the security information based on at least one encryption techniques. The encryption technique may be determined in the security server 410 in advance, and data exchanged between the security server 410 and the electronic device 100 may be encrypted or decrypted based on the encryption technique.

In step 1230, the electronic device 100 transmits the encrypted security information to the security server. Specifically, the controller 110 may control at least one of the mobile communication module 120, and the WLAN module 131 and the short-range communication module 132 included in the sub-communication module 130 to transmit the encrypted security information to the security server. Referring to FIG. 8, there may be multiple electronic devices.

The security server 410 may receive the encrypted security information from a first electronic device, e.g., the electronic device 100 among the multiple electronic devices. The security server 410 may also include at least one communication module to perform communication with the multiple electronic devices.

The security server 410 may receive the encrypted security information from at least one of the multiple electronic devices. In step 1232, the security server 410 may perform security authentication with the encrypted security information. Specifically, the security server 410 may perform the security authentication by comparing the encrypted security information with the user's security information pre-stored in the security server 410. The security authentication may refer to determining whether authentication is successful by comparing the encrypted security information with pre-stored user's security information. The pre-stored user's security information may be security information of the user, which was authenticated beforehand. The user's security information may be stored in a storage of the security server 410 beforehand. The security server 410 may authenticate the security information received, if the encrypted security information matches the pre-stored user's security information.

For example, the pre-stored user's security information may be the user's signature information, number information or gesture pattern information, which was authenticated beforehand. The security server 410 may perform the authentication by comparing the encrypted security information with the pre-stored user's security information. For example, the security server may perform the authentication by comparing the security information received, such as the signature information with the pre-stored user's security information. Specifically, the security server 410 may perform the authentication by comparing the signature information included in the input security information with signature information included in the pre-stored user's security information.

The security server 410 may authenticate the encrypted security information, if the signature information included in the encrypted security information matches signature information included in the pre-stored user's security information. After authentication of the encrypted security information, the security server 410 may create authentication token information. The authentication token information may prove that the encrypted security information was authenticated.

In step 1234, the security server 410 may send the authentication token information to the electronic device 100. The electronic device 100 may then receive the authentication token information from the security server 410.

Otherwise, if the encrypted security information does not match the pre-stored user's security information, the security server 410 may not authenticate the encrypted security information. In this case where the encrypted security information was not authenticated, the security server 410 may create unauthentication token information. The unauthentication token information may prove that the encrypted security information was not authenticated. In step 1236, the security server 410 may send the unauthentication token information to the electronic device 100. The electronic device 100 may then receive the unauthentication token information from the security server 410. The controller 110 may return to step 1212 to determine if the accessory's user information has been detected. Alternatively, after step 1236, the controller 110 may stop the process. After ending the process, the controller 110 may resume displaying the ordinary screen.

As such, the security authentication is performed by the security server outside of the electronic device, so the electronic device may not need to retain the security information. If the electronic device retains the security information, the electronic device is likely to be a victim of hacking. However, as described above, in various embodiments of the present disclosure, since the encrypted security information is sent to the security server, which performs the security authentication, the electronic device does not need to store the security information.

In step 1240, it is determined from the authentication token information received whether the authentication was successful or failed. The controller 110 may determine from the authentication token information received whether the authentication was successful or failed. Specifically, when receiving the authentication token information from the security server 410, the controller 110 may determine that the authentication was successful and thus switch the electronic device 100 into the security environment, in step 1250. On the contrary, when receiving the unauthentication token information from the security server 410, the controller 110 may determine that the authentication was failed and go to step 1220 to receive security information again.

If it is determined that the authentication was successful, in step 1250, the electronic device 110 is switched into the security environment. That is, the controller 110 switches the electronic device 100 into the security environment if the authentication was successful. The security environment refers to an environment entered only if the authentication is successful. For example, the security environment may be a company environment, individual private environment, or public agency environment that requires security authentication. In the security environment, tasks in need of security may be performed. For example, applications in need of security may be executed in the security environment. In addition, in the security environment, tasks to deal with confidential data may be performed.

Turning back to FIG. 8, there may be multiple electronic devices. For example, there may be a first electronic device, e.g., the electronic device 100 and a second electronic device, e.g., the electronic device 400. The first electronic device 100 may detect connection of an accessory, such as the electronic pen 200, receive security information, such as signature information, and send the security information to the security server 410. After successful authentication through a security authentication process in the security server 410, the first electronic device 100 may be switched into the security environment. If the second electronic device 400 also detects connection of the accessory, such as the electronic pen 200, the second electronic device 400 may also receive the security information, such as the signature information and send the security information to the security server 410 as the first electronic device 100 did. After successful authentication through the security authentication process in the security server 410, the second electronic device 400 may be switched into the security environment.

According to various embodiments of the present disclosure, multiple electronic devices may be switched into security environments by using the security server 410 that performs the security authentication for the multiple electronic devices. Then, the user may switch the multiple electronic devices into the security environment even while using the multiple electronic devices. For example, the user may switch his mobile device, e.g., the first electronic device 100 into the security environment by approaching the electronic pen 200 to the first electronic device 100 and perform a task in the first electronic device 100 under the security environment, in office A, and the user may leave the office A and go into office B, in which the user may switch a tablet device, e.g., the second electronic device 400 into the same security environment by approaching the electronic pen 200 to the second electronic device 400 and then resume the task in the second electronic device 400.

Figure 9:
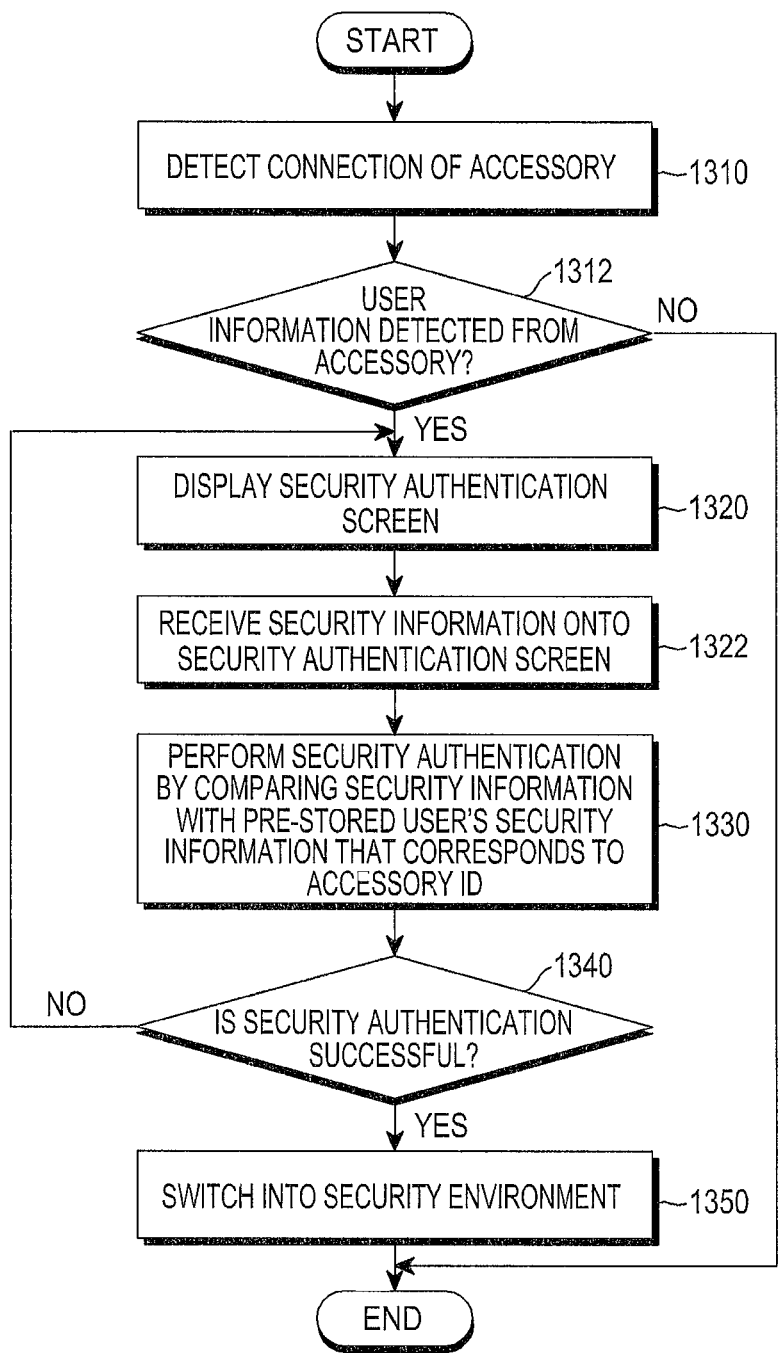
FIG. 9 is flowchart illustrating operations of a method for providing security environment, according to an embodiment of the present disclosure.
Figure 11:
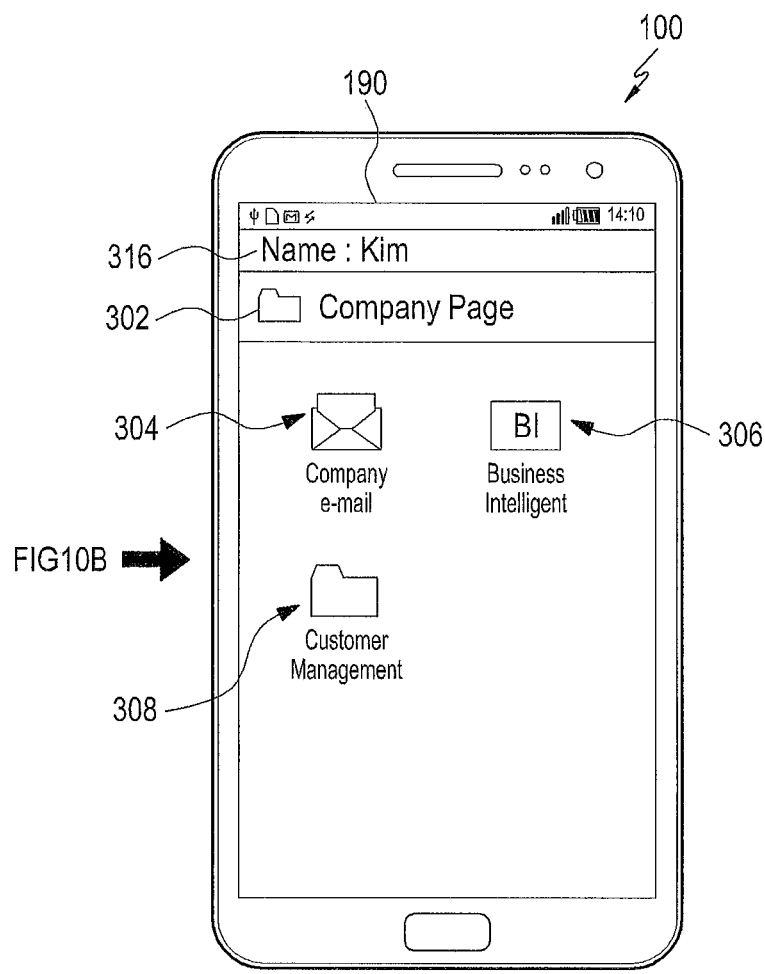
FIG. 11 illustrates an electronic device performing a security environment providing method, according to an embodiment of the present disclosure.

FIG. 9 is flowchart illustrating operations of a method for providing security environment, according to another embodiment of the present disclosure, and FIGS. 10 and 11 illustrate the electronic device performing a method for providing security environment, according to the embodiment of the present disclosure.

Referring to FIG. 9, in the embodiment of the method for providing security environment, in step 1310, connection of an accessory is detected.

That is, the controller 110 of the electronic device 100 may detect the connection of the accessory. The accessory includes at least one of an electronic pen and an ID card. The controller 110 may detect connection of the accessory, e.g., at least one of the electronic pen or the ID card.

The detection of connection of the accessory may be made through wireless communication. Specifically, the controller 110 may control the short-range communication module 132 to perform wireless communication with the accessory. For example, the controller 110 may detect the connection of the accessory through wireless communication, such as Bluetooth, Infrared, WLAN, Wi-Fi or NFC communication. The accessory may also include a short-range communication module for wireless communication. For example, upon reception of a proximity signal from the accessory in the wireless communication, the controller 110 may detect the connection of the accessory.

While doing this, the controller 110 may display an ordinary screen under an ordinary environment rather than the security environment. The ordinary screen may not require security, such as home screen.

Referring to FIG. 10A, the controller 110 may detect connection of an accessory, such as the electronic pen 200. The controller 110 may detect connection of the accessory by controlling the short-range communication module 132 to perform short-range communication, such as Bluetooth, Infrared, NFC communication, etc., or to perform WLAN communication, such as WiFi communication with the accessory. The electronic pen 200 may also include a short-range communication module for wireless communication. As shown in FIG. 10A, the controller 110 may display an ordinary screen, such as a home screen on the display unit 190.

The accessory may include an identification (ID). The accessory ID may be unique to the accessory. The accessory ID may also include information regarding the user of the accessory. For example, the accessory ID may include, but not limited to, the name of the user, the user's post, the user's phone number, the user's age, or the user's address. The controller 110 may receive the accessory ID from the accessory through wireless communication. The controller 110 may thus identify the accessory connected to the electronic device 100 based on the accessory ID. The controller 110 may detect the information regarding the user, e.g., the name of the user from the accessory ID.

Subsequently, in step 1312, it is determined whether the user information has been detected. That is, the controller 110 may determine if the accessory's user information has been detected. Alternatively, the accessory may also detect the user information and transmit the user information to the electronic device 100. The user information may indicate that the accessory may be used in a security environment. If the accessory's user information is detected, the controller 110 is allowed to receive security information. If the accessory's user information is not detected, the controller 110 ends the process.

In step 1320, a security authentication screen is displayed. The controller 110 may control the display unit 110 to display the security authentication screen. The security authentication screen may include a window to receive the security information.

Referring to FIG. 10B, a security authentication screen 310 is illustrated. The security authentication screen 310 may include a pop-up window 314 to receive the security information.

Alternatively, the controller 110 may display the security authentication screen upon detection of button 220 press. When the button 220 is pressed, the controller 110 may detect the pressure of the button 220 from a change of electromagnetic signals exchanged between the electronic pen 200 and the electronic device 100. The controller 110 may then display the security authentication screen 310 upon detection of the pressure of the button 220. The security authentication screen 310 may include the pop-up window 314 to receive the security information.

Subsequently, in step 1322, security information is received. That is, the controller 110 may receive the security information. The security information may correspond to a password required for security authentication. For example, the security information may be signature information, number information, or gesture pattern information. The security information may be entered through the security authentication screen 310. For example, the controller 110 may receive the security information, such as signature information, number information, or gesture pattern information through the security authentication screen 310 displayed in the display unit 110, which may be in the form of a touch screen. In other words, the controller 110 may receive the security information by detecting a signature, number or gesture pattern input onto the security authentication screen displayed in the display unit 190.

Referring to FIG. 10B, the controller 110 may receive the security information, e.g., signature information 300 through the security authentication screen 310. The controller 110 may also display notification 312 that security information be entered. The controller 110 may display the notification as well as information regarding the user of the accessory, e.g. the name of the user, which is included in the accessory ID received. For example, if the name of the accessory user is Kim', the controller 110 may display the notification 312 of "Mr./Ms. Kim, please enter your signature". In addition, the controller 110 may detect touching or hovering of the electronic pen 200 on the security authentication screen 310, which corresponds to the signature information 300. In other words, the controller 110 may receive the security information, such as the signature information 300 by means of touching or hovering of the electronic pen 200 on the security authentication screen 310.

In step 1330, security authentication is performed with the security information received. That is, the controller 110 may perform the security authentication with the security information. The security authentication may refer to determining whether authentication is successful by comparing the security information received with pre-stored user's security information that corresponds to the accessory ID. The pre-stored user's security information may be security information of the user, which was authenticated beforehand. The user's security information may be stored in the storage 175 beforehand. The controller 110 may authenticate the security information received, if the security information received matches the pre-stored user's security information that corresponds to the accessory ID. For example, the pre-stored user's security information that corresponds to the accessory ID may be the user's signature information, number information or gesture pattern information that corresponds to the accessory ID, which was authenticated beforehand. The controller 110 may perform the authentication by comparing the security information received with the pre-stored user's security information that corresponds to the accessory ID. For example, as shown in FIG. 10B, the controller 110 may perform the authentication by comparing the signature information 300 with pre-stored user's security information that corresponds to the accessory ID. Specifically, the controller 110 may perform the authentication by comparing the signature information 300 included in the security information with signature information included in the pre-stored user's security information that corresponds to the accessory ID.

The accessory ID may include, but not limited to, information regarding the name of the user, the user's post, the user's phone number, the user's age, or the user's address. For example, if the accessory user is 'Kim' according to the accessory ID, the controller 110 may detect signature information included in the pre-stored user's security information of the user 'Kim'. The controller 110 may perform the authentication by comparing the signature information 300 included in the security information with signature information included in the pre-stored user's security information of the user 'Kim'.

The controller 110 may authenticate the security information received, if the security information received matches the pre-stored user's security information of the user 'Kim'. On the contrary, the controller 110 may not authenticate the security information received, if the signature information 300 included in the security information received does not match or correspond to signature information included in the pre-stored user's security information of the user 'Kim'.

In another embodiment of the present disclosure, the controller 110 may encrypt the security information. That is, the controller 110 may encrypt the security information so as to be decrypted by the security server. The controller 110 may send the encrypted security information to the security server. Specifically, the controller 110 may control at least one of the mobile communication module 120, and the WLAN module 131 and the short-range communication module 132 included in the sub-communication module 130 to transmit the encrypted security information to the security server. Turning back to FIG. 8, there may be multiple electronic devices. Among the multiple electronic devices, the first electronic device 100 may transmit the encrypted security information to the security server 410. The security server 410 may also include at least one communication module to perform communication with the multiple electronic devices.

Authentication token information may be created by the security server 410 when the encrypted security information is authenticated based on the comparison of the security information with the user's security information pre-stored in the security server 410. The controller 110 may receive the authentication token information from the security server 410.

Explaining in more detail, the security server may receive the encrypted security information. The security server may perform security authentication with the encrypted security information. That is, the security server may perform the security authentication by comparing the encrypted security information with the user's security information pre-stored in the security server.

The security authentication may refer to determining whether authentication is successful by comparing the encrypted security information with pre-stored user's security information. The pre-stored user's security information may be security information of the user, which was authenticated beforehand. The user's security information may be stored in a storage of the security server beforehand. The security server may authenticate the security information received, if the encrypted security information matches the pre-stored user's security information.

For example, the security server may perform the authentication by comparing the encrypted security information with the pre-stored user's security information. The security server may authenticate the encrypted security information if the encrypted security information matches the pre-stored user's security information. If the authentication of the encrypted security information was successful, the security server may create the authentication token information. The authentication token information may prove that the encrypted security information was authenticated. The security server may then transmit the authentication token information to the electronic device 100. Thus, the electronic device 100 may receive the authentication token information from the security server 410.

Otherwise, if the encrypted security information does not match the pre-stored user's security information, the security server 410 may not authenticate the encrypted security information. In this case where the encrypted security information is not authenticated, the security server 410 may create unauthentication token information. The unauthentication token information may prove that the encrypted security information was not authenticated. The security server 410 may then transmit the unauthentication token information to the electronic device 100. Thus, the electronic device 100 may receive the unauthentication token information from the security server 410. The controller 110 of the electronic device 100 may determine again if the accessory's user information has been detected. Alternatively, the controller 110 may stop the authentication process. After ending the authentication process, the controller 110 may resume displaying the ordinary screen.

In step 1340, it is determined whether the authentication was successful or failed. That is, the controller 110 may determine whether the authentication was successful or failed. In step 1350, the controller 110 switches the electronic device 100 into the security environment if the authentication was successful. Otherwise, if the authentication was failed, the controller 110 may go back to step 1322 to receive security information again.

If it is determined that the authentication was successful, in step 1350, the electronic device 110 is switched into the security environment. That is, the controller 110 switches the electronic device 100 into the security environment if the authentication was successful. The security environment refers to an environment entered only if authentication is successful. For example, the security environment may be a company environment, individual private environment, or public agency environment that requires the security authentication process. In the security environment, tasks in need of security may be performed. For example, applications in need of security may be executed in the security environment. In addition, in the security environment, tasks to deal with confidential data may be performed.

As shown in FIG. 10B, when the security information received is authenticated since the security information, such as the signature information 300 matches signature information included in the pre-stored user's security information, the controller 110 may switch the electronic device 100 into the security environment.

FIG. 11 illustrates the electronic device under a company environment as the security environment. Referring to FIG. 11, in the company environment, a company page 302 may be displayed on the electronic device 100.

In the company environment, the electronic device 100 runs applications in need of security, such as a company e-mail application, a business intelligent application, etc. In addition, in the company environment, tasks to deal with confidential data e.g., related to customer management may be performed. The controller 110 may display the shortcut icon 304 for running the company e-mail application, the shortcut icon 306 for running the business intelligent application, or the shortcut icon 308 for opening a customer management folder on the display unit 190. The controller 110 may display information regarding the user, which is included in the accessory ID, such as the name of the user, the user's post, the user's phone number, the user's age, or the user's address. For example, as shown in FIG. 11, 'Kim' 316, the name of the accessory user, included in the accessory ID may be displayed.

According to various embodiments of the present disclosure, upon detection of connection of an accessory, the electronic device receives the accessory ID and performs the authentication by comparing input security information to pre-stored user's security information that corresponds to the accessory ID.

According to various embodiments of the present disclosure, upon detection of connection of an accessory, the electronic device may receive the accessory ID and display user information that corresponds to the accessory ID while being switched into the security environment.

According to various embodiments of the present disclosure, security information may be entered through a currently running screen, upon detection of connection of an accessory.

The security information may be entered immediately upon detection of connection of the accessory, without separate steps.

In addition, once the authentication was successful with the security information, the electronic device may be immediately switched into the security environment.

In some embodiments, authentication may be performed by a security server outside of the electronic device, so the electronic device may not retain the security information.

Multiple electronic devices may be switched into the security environment through security authentication processes performed by the security server, and a user who uses the multiple electronic devices may switch them into the security environment.

Furthermore, upon detection of connection of an accessory, an electronic device receives the accessory's identification (ID) and performs the authentication by comparing input security information with pre-stored user's security information that corresponds to the accessory ID.

While being switched into the security environment, the electronic device may display the user information that corresponds to the accessory ID.

It will be appreciated that the embodiments of the present disclosure may be implemented in a form of hardware, software, or a combination of hardware and software. The software may be stored as program instructions or computer readable codes executable on the processor on a computer-readable medium. Examples of the computer readable recording medium include magnetic storage media (e.g., ROM, floppy disks, hard disks, etc.), and optical recording media (e.g., CD-ROMs, or DVDs). The computer readable recording medium can also be distributed over network coupled computer systems so that the computer readable code is stored and executed in a distributed fashion. This media can be read by the computer, stored in the memory, and executed by the processor. The memory included in the power transmitter or the power receiver may be an example of the computer readable recording medium suitable for storing a program or programs having instructions that implement the embodiments of the present disclosure. The exemplary embodiments may be implemented by a program having codes for embodying the apparatus and method described in claims, the program being stored in a machine (or computer) readable storage medium. The program may be electronically carried on any medium, such as communication signals transferred via wired or wireless connection, and the present disclosure suitably includes its equivalent.

The electronic device may receive the program from a program provider wired/wirelessly connected thereto, and store the program. The program provider may include a memory for storing programs having instructions to perform the embodiments of the present disclosure, information necessary for the embodiments of the present disclosure, etc., a communication unit for wired/wirelessly communicating with the electronic device, and a controller for sending the program to the transceiver at the request of the electronic device or automatically.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing a security environment of a mobile device, the method comprising:
    displaying a first screen on a display;
    identifying, by the mobile device, an identifier of an electronic pen from the electronic pen in response to detection of the electronic pen;
    in response to identifying the identifier of the electronic pen, setting an entire region of the first screen that is being displayed on the display as a security authentication screen for receiving handwriting input associated with an identifier of a user of the mobile device;
    receiving, by the mobile device, the handwriting input by the electronic pen through at least part region among the first screen of which the entire region is set to receive the handwriting input, wherein at least one function associated with at least one object included in the first screen that is being displayed on the display is inactivated even though the at least one object is touched while the handwriting input is received;
    encrypting, by the mobile device, the received handwriting input, and transmitting the encrypted handwriting input to a security server;
    receiving, by the mobile device, authentication token information from the security server in response to transmitting the encrypted handwriting input;
    identifying, by the mobile device, whether security authentication is successful based on the authentication token information received from the security server; and
    providing a second screen associated with the security environment when the security authentication is successful.

2. The method of claim 1, wherein the detection of the electronic pen is performed through wireless communication with the electronic pen.

3. The method of claim 1, wherein the security server performs the security authentication by comparing the encrypted handwriting input with a user's pre-stored handwriting input that corresponds to the identifier of the electronic pen, and
    wherein the user's pre-stored handwriting input is previously registered and authenticated.

4. The method of claim 1, further comprising:
    displaying an object indicating the security authentication screen on the first screen upon detection of the electronic pen,
    wherein the handwriting input is input onto the object indicating the security authentication screen.

5. The method of claim 1, wherein the electronic pen includes a button, the method further comprising:
displaying an object indicating the security authentication screen on the first screen upon detection of an input of the button of the electronic pen,
wherein the handwriting input is input onto the object indicating the security authentication screen.

6. A mobile device for providing a security environment, the mobile device comprising:
a display; and
a controller, comprising hardware, the controller configured to:
control the display to display a first screen;
identify an identifier of an electronic pen from the electronic pen in response to detection of the electronic pen;
in response to identifying the identifier of the electronic pen, set an entire region of the first screen that is being displayed on the display as a security authentication screen for receiving handwriting input associated with an identifier of a user of the mobile device;
receive the handwriting input by the electronic pen through at least part region among the first screen of which the entire region is set to receive the handwriting input, wherein at least one function associated with at least one object included in the first screen that is being displayed on the display is inactivated even though the at least one object is touched while the handwriting input is received;
encrypt the received handwriting input;
transmit the encrypted handwriting input to a security server;
receive authentication token information from the security server in response to transmitting the encrypted handwriting input;
identify whether security authentication is successful based on the authentication token information received from the security server; and
provide a second screen associated with the security environment when the security authentication is successful.

7. The mobile device of claim 6, wherein the controller is configured to detect the electronic pen via wireless communication with the electronic pen.

8. The mobile device of claim 6, wherein the authentication token information is created by the security server, and the security server performs the security authentication by comparing the encrypted handwriting input with a user's pre-stored handwriting input that corresponds to the identifier of the electronic pen, and
wherein the user's pre-stored handwriting input is previously registered and authenticated.

9. The mobile device of claim 6, wherein:
the controller is configured to control the display to display an object indicating the security authentication screen on the first screen upon detection of the electronic pen,
wherein the handwriting input is input onto the object indicating the security authentication screen.

10. The mobile device of claim 6, wherein:
the electronic pen includes a button, and
the controller is configured to control the display to display an object indicating the security authentication screen on the first screen upon detection of an input of the button of the electronic pen,
wherein the handwriting input is input onto the object indicating the security authentication screen.

* * * * *